July 17, 1928.

H. P. MacGREGOR 1,677,525

LUBRICATED PLUG VALVE

Filed April 5, 1927

INVENTOR
H. P. MacGregor
by
James E. Bradley
atty

Patented July 17, 1928.

1,677,525

UNITED STATES PATENT OFFICE.

HALBERT P. MacGREGOR, OF CLAYTON, MISSOURI, ASSIGNOR TO MacGREGOR VALVE COMPANY, OF ST. LOUIS, MISSOURI, A CORPORATION OF MISSOURI.

LUBRICATED PLUG VALVE.

Application filed April 5, 1927. Serial No. 181,114.

Figure 1:
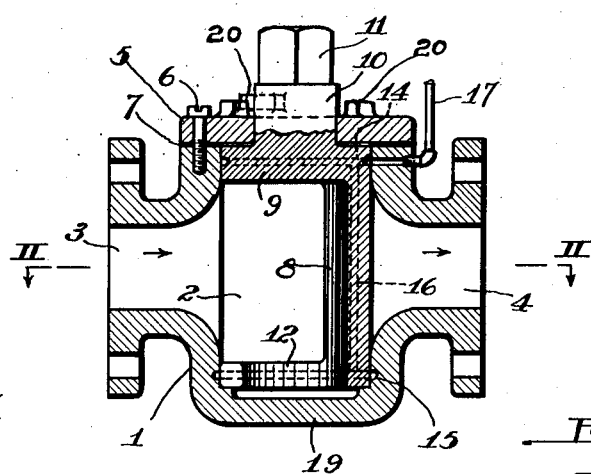
Figure 7:
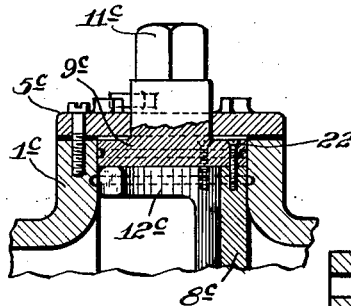
Figure 6:
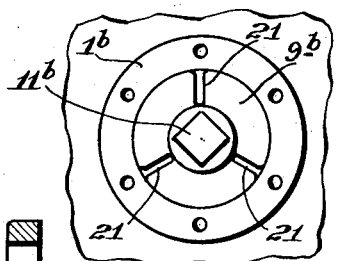
Figure 2:
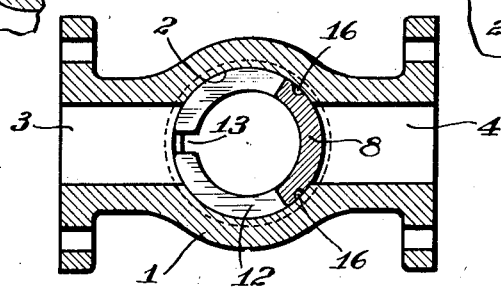
Figures 3, 4:
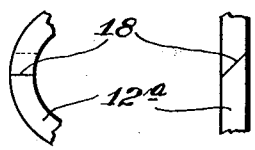
Figure 5:
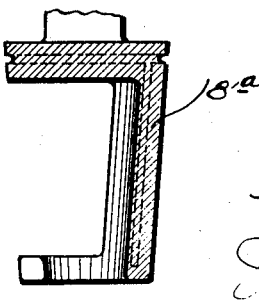

The invention relates to lubricated plug valves. It has for its principal objects the provision of an improved valve of cheap, simple construction, in which the application of pressure by means of the lubricant employed serves to loosen the valve, so that it may be turned without difficulty, and in which the lubricant, as thus supplied, is caused to flow over the rubbing surfaces of the plug and valve casing and also to act as a seal, so that leakage is avoided, without the use of supplemental packing means. Certain embodiments of the invention are shown in the accompanying drawings, wherein:

Figure 1 is a vertical section through one form of the valve. Fig. 2 is a section on the line II—II of Fig. 1. Figs. 3 and 4 are fragmentary views showing a modified detail of construction. Fig. 5 is a vertical section through a modified form of plug. And Figs. 6 and 7 show two other modifications in plan and section, respectively.

Referring to the drawings, 1 is the valve body, or casing, provided with a bore 2 and a passage transverse thereto, comprising the inlet 3 and the outlet 4. The upper side of the casing is open to permit of the insertion of the plug, with a cap or closure 5 over such side held by the bolts or screws 6, a gasket 7 being preferably interposed between the cap and the surface of the valve body. The lower side of the body is preferably closed by the integral plate 19, the use of such closure obviating the requirement for packing, such as would be necessary in case a separate closure were employed.

The valve plug comprises a parti-tubular shell 8, having integral with its upper end the disc 9, such disc carrying the stem or boss 10 with the squared end 11 for the reception of a handle or other suitable turning device. Integral with the lower end of the shell is the ring 12, such ring being in two parts with the space 13 between the ends thereof, as indicated in Fig. 2. A circumferential groove 14 for lubricant is provided around the periphery of the disc 10, while a similar groove 15 is provided around the ring 12. Vertical grooves 16, 16 connect the two circumferential grooves. It is more or less immaterial which of the opposing rubbing surfaces carry the grooves, or whether they are formed in part in one member and in part in the other, although the arrangement, as shown, is preferred.

A pipe 17 serves to supply a suitable lubricant under pressure to the upper circumferential groove 14. Any suitable pressure device, such as, a grease gun, may be employed for securing the necessary supply of lubricant under pressure. The shell 8 is preferably of relatively light, springy metal, so that when a heavy pressure is applied to the vertical grooves 16, 16 and to the bottom groove 15, the shell is sprung slightly away from the surface of the bore. This yielding of the shell is promoted by the fact that the ring 12 is split, so that the ends are free to approach each other. At the same time, such ring provides an effective bearing member for the lower end of the plug. The slight separation of the surface of the shell from that of the bore, as above described, is sufficient to admit a film of lubricant, which is carried by capillary attraction, and by the turning action of the shell, throughout the contacting areas of the shell and bore. The yielding of the shell under pressure, not only provides for a thorough lubrication of the rubbing surfaces, but, even more important, serves to free the plug in case it should have become stuck against rotary movement. The lubricant, when of the proper consistency, acts as a seal for the valve as it fills the upper groove 14, preventing the upward escape of any liquid from the interior of the valve past the disc 9 and along the boss 10. The requirement for a stuffing box around the boss is thus avoided. The disc 9 with its groove 15 thus acts as a packing means at the open end of the casing, where such packing is required, and further acts as a reinforcing means for the upper end of the shell, so that there is no substantial deformation of the plug under the pressure of the lubricant at this point, and hence no leakage, due to such deformation. As pointed out heretofore, this requirement does not obtain at the lower end of the shell where the valve casing is closed, and at such point a yielding of the shell is provided to permit the shell to separate more readily from the bore for lubricating purposes.

As heretofore indicated, the left hand side of the casing (Fig. 1) is the inlet side, as the pressure of the liquid, thus applied, tends to still more firmly seat the shell 8 against the bore of the casing, and thus prevent leakage, while a reversal of this arrangement, with the right hand side of the valve as the inlet, or pressure side, would give the reverse effect, as the pressure would tend to spring the shell 8 away from its seat, and thus cause leakage. In order to insure that the valve shell will always occupy the proper position with its concave side facing the inlet of the valve, suitable stops 20 are provided on the cover 5 for engaging a suitable projection on the boss 10 and limiting the rotary movement, after it has reached free open or full closed position.

Figs. 3 and 4 show a different form of construction of the ring at the bottom of the shell. Here the ring 12ª, instead of having its ends separated, as indicated in Fig. 2, has such ends overlapping like a piston ring, as indicated at 18. This permits of a reduction of the diameter of the ring when pressure is applied to the shell 8, the same as in the construction of Figs. 1 and 2.

Fig. 5 shows another modification in which the shell 8ª of the plug valve is tapered, as in the ordinary plug valve construction. The bore of the valve body is, of course, similarly tapered to fit the plug, but in other respects, the construction is the same throughout, and the functions secured the same, as in the construction of Figs. 1 and 2. It will thus be understood that the invention is not limited to a plug shell which is a part of a true cylinder, but applies equally well to the tapering construction. It will also be understood that the arc through which the shell 8 extends may vary without departing from the invention. Such arc may be increased to any desired extent, the only requirement being that the longitudinal edges of the shell be free to move relatively to permit the shell to contract in diameter when the lubricating pressure is applied, and that such shell be suitably cut away to permit the necessary passage of liquid therethrough when the shell is moved to open position. The invention contemplates all arrangements in which the shell constituting the plug is free to contract under the application of lubricating pressure between its surface and that of the bore of the casing. The shell of relatively limited circumferential extent, as shown, is preferred, however, because of the less degree of pressure required in order to cause its lower portion to spring away from the bore of the casing.

Fig. 6 illustrates a modified form of plug, the view showing such plug in plan in the casing 1ᵇ with the cover 5 removed. The plug is the same as that of Figs. 1 and 2, except that the disc 9ᵇ at the upper end of the plug, instead of being solid, is split into a plurality of segments by the slots 21. These segments are integral with the boss or stem 11ᵇ of the valve. This gives the upper end of the plug flexibility so that when the oil pressure is applied, such upper end can give as well as the lower end, and under certain conditions, this additional flexibility in the shell or plug is advantageous.

Fig. 7 is a vertical section showing still another modification at the upper end of the plug or shell 8ᶜ. In this construction, the shell is provided with a split ring at its upper end like the ring 12 of Fig. 1 or the ring 12ª of Figs. 3 and 4. A disc 9ᶜ lies above the ring, being provided with the stem 11ᶜ. The disc is secured to the parts 8ᶜ and 12ᶜ by screws or pins 22, so that the rotation of the disc rotates the plug. This construction is also designed to give the upper end of the plug or shell greater flexibility. The invention is not limited to the particular embodiment of valve shown in which the inlet and outlet passages 3 and 4 are in alinement, as the shell 16 will function as heretofore set forth regardless of the direction of movement of the fluid as it enters the valve.

What I claim is:

1. In combination, a valve body having a bore therethrough and a passage for liquid, and a shell of tubular shape, but cut away longitudinally so that its side edges are free to move relatively, mounted for rotation in the bore with its outer surface fitting against the inner surface of the bore, and means for applying fluid under pressure between said surfaces so as to spring the shell slightly away from said surface of the bore.

2. In combination, a valve body having a bore therethrough and a passage for liquid, and a shell of tubular shape, but cut away longitudinally so that its side edges are free to move relatively, mounted for rotation in the bore with its outer surface fitting against the inner surface of the bore, and means for applying a lubricant under pressure between said surfaces so as to spring the shell slightly away from said surface of the bore.

3. In combination, a valve body having a bore therethrough and a passage for liquid, and a shell of tubular shape, but cut away longitudinally so that its side edges are free to move relatively, and formed of relatively thin resilient material mounted for rotation in the bore with its outer surface fitting against the inner surface of the bore, and means for applying a lubricant under pressure between said surfaces, so as to spring the shell slightly away from said surface of the bore and so loosen the shell and provide a space for lubricant between the surfaces.

4. In combination, a valve body having a bore therethrough and a passage for liquid, and a shell of tubular shape, but cut away longitudinally so that its side edges are free to move relatively, reinforced against deformation at one of its ends and mounted for rotation in the bore with its outer surface fitting against the inner surface of the bore, and means for applying fluid under pressure between said surfaces so as to spring the shell slightly away from said surface of the bore.

5. In combination, a valve body having a bore therethrough and a passage for liquid, and a shell of tubular shape, but cut away longitudinally so that its side edges are free to move relatively, having a reinforcing means at one end and an annular split bearing ring at the other end and mounted for rotation in the bore with its outer surface fitting against the inner surface of the bore, and means for applying fluid under pressure between said surfaces so as to spring the shell slightly away from said surface of the bore.

6. In combination, a valve body having a bore therethrough and a passage for liquid, and a shell of tubular shape, but cut away longitudinally so that its side edges are free to move relatively, mounted for rotation in the bore with its outer surface fitting against the inner surface of the bore, a lubricating groove in one of said surfaces, and means for applying a lubricant to said groove under a pressure such that the shell will be sprung slightly away from the surface of the bore.

7. In combination, a valve body having a bore therethrough and a passage for liquid, and a parti-tubular shell constituting a plug or valve for controlling the passage mounted for rotation in the bore, and means for applying fluid under pressure between the contacting surfaces of the shell and the bore, so as to spring the shell slightly away from the surface of the bore.

8. In combination, a valve body having a bore therethrough and a passage for liquid, and a parti-tubular shell constituting a plug or valve for controlling the passage mounted for rotation in the bore, and means for applying fluid under pressure between the contacting surfaces of the shell and the bore, so as to spring the shell slightly away from the surface of the bore, the shell having a disc reinforcing means at one end with a packing groove for lubricant between the periphery of the disc and the surface of the bore.

In testimony whereof, I have hereunto subscribed my name this 30th day of March, 1927.

HALBERT P. MacGREGOR.